United States Patent [19]

Lawrence

[11] Patent Number: 5,909,468
[45] Date of Patent: Jun. 1, 1999

[54] METHOD AND APPARATUS FOR ENCODING PCR DATA ON A FREQUENCY REFERENCE CARRIER

[75] Inventor: Steven F. Lawrence, Toronto, Canada

[73] Assignee: Scientific-Atlanta, Inc., Norcross, Ga.

[21] Appl. No.: 08/827,457

[22] Filed: Mar. 28, 1997

[51] Int. Cl.[6] .............. H04L 27/12; H04L 27/20; H04L 23/00; H03K 7/00
[52] U.S. Cl. .............. 375/295; 375/377; 348/523; 332/106
[58] Field of Search ............... 375/354, 377, 375/238, 353, 259, 296, 295; 348/521, 523, 524, 500, 464; 370/212; 332/106, 109, 115

[56] References Cited

U.S. PATENT DOCUMENTS 5,661,758  8/1997  Long ........................ 375/296
5,710,977  1/1998  Nakazawa ................... 455/65

*Primary Examiner*—Stephen Chin
*Assistant Examiner*—Betsy L. Deppe
*Attorney, Agent, or Firm*—Kenneth M. Massaroni; Kelly A. Gardner; Hubert J. Barnhardt III

[57] ABSTRACT

The present invention provides a method and apparatus for providing program clock reference (PCR) data to various devices in a digital transmission system in a robust manner. According to the present invention, PCR data representative of a snapshot of the system clock is encoded only an existing frequency reference signal. The frequency reference signal is a signal to which all clock dependent components lock to ensure that the proper frequency lock is used. By encoding the frequency reference with PCR data, effectively using the frequency reference as a PCR carrier wave, the PCR is efficiently and robustly delivered to the various devices requiring this PCR data.

17 Claims, 5 Drawing Sheets

METHOD AND APPARATUS FOR ENCODING PCR DATA ON A FREQUENCY REFERENCE CARRIER

FIELD OF THE INVENTION

The present invention relates to a method and apparatus for providing program clock reference (PCR) data to various devices in an MPEG-2 based system. In particular, the invention is directed to encoding PCR data on a frequency reference carrier, such as, for example, a synchronization carrier wave, thereby distributing the PCR data among various devices in a robust manner.

BACKGROUND OF THE INVENTION

Various standards have emerged for the transport of digital data, such as, for example, digital television data. One example of such a standard is the Motion Picture Experts Group (MPEG) standard, referred to as MPEG-2. The MPEG-2 standard is widely known and recognized as the video and audio compression specification sanctioned by the International Standards Organization (ISO) in Document ISO 13818. MPEG-2 is composed of four parts: video; audio; systems; and compliance. The MPEG-2 standard provides a syntax and set of rules for the construction of bit streams containing a multiplexed combination of one or more programs. A program is composed of one or more related elementary streams. An elementary stream is the coded representation of a single video, audio or other data stream that shares the common time base of the program for which it is a member. For example, in the context of a subscription television system, a program may comprise a network television broadcast consisting of two elementary streams: a video stream and an audio stream.

In addition to video and audio compression features, the MPEG-2 specification also contains a systems layer that provides a transmission medium independent coding technique to build bitstreams containing one or more MPEG programs. The MPEG coding technique uses formal grammar (i.e., "syntax") and a set of semantic rules for the construction of bitstreams to be transmitted. The syntax and semantic rules include provisions for multiplexing, clock recovery, synchronization and error resiliency.

The MPEG-2 transport stream is specifically designed for transmission in conditions that can generate data errors. MPEG transport packets each have a fixed length of 188 bytes. Many programs, each with different components, may be combined in a transport stream. Examples of services that may be provided using MPEG format are television services broadcast over terrestrial, cable television and satellite networks, as well as interactive telephony-based services. The syntax and semantics of the MPEG-2 transport stream are defined in the International Organisation for Standardisation, ISO/IEC 13818-1, International Standard, Nov. 13, 1994, entitled "Generic Coding of Moving Pictures and Associated Audio: Systems", recommendation H.222.0, and ISO/IEC 13818-2, International Standard, 1995, entitled, "Generic Coding of Moving Pictures and Associated Audio: Video", recommendation H262, both incorporated herein by reference, in their entireties.

Multiplexing according to the MPEG-2 standard is accomplished by packaging raw elementary data streams such as coded video and audio into packetized elementary stream (PES) packets which are then inserted into transport packets. As noted above, each MPEG-2 transport packet has a fixed length of 188 bytes. The first byte is a synchronization byte having a unique eight-bit pattern. The synchronization byte is used to locate the beginning of each transport packet.

Following the synchronization byte, there is a three byte prefix that includes a one bit transport packet error indicator, a one bit payload unit start indicator, a one bit transport priority indicator, a 13 bit packet identifier (PID), a two bit transport scrambling control, a two bit adaptation field control, and a four bit continuity counter. Use of the synchronization byte and the three byte prefix leaves up to 184 bytes of payload which carry the data to be communicated. An optional adaptation field may follow the prefix for carrying both MPEG related and private information relevant to a given transport stream or the elementary stream carried within a given transport packet. Provisions for clock recovery, such as, for example, a program clock reference (PCR) and splicing control are typical of the information carried in the adaptation field. By placing such information in the adaptation field, it becomes encapsulated with its associated data to facilitate remultiplexing and network routing operations. When an adaptation field is used, the payload is correspondingly shorter.

The PCR is a count which reflects the value of the system time clock for the associated program at the time the PCR bytes were inserted into the transport stream. The decoder uses the PCR to synchronize a decoder time clock with the encoder system clock. The lower nine bits of the 42-bit PCR provide a modulo-300 counter that is incremented at the system clock rate. Since each program or service carried by the data stream may have its own PCR, the programs and services may be multiplexed asynchronously.

As defined in the MPEG-2 systems standard, an elementary stream, whether video, audio or some other type of data, contains a continuous stream of access units. An access unit is the coded representation of a presentation unit. For video elementary streams, the presentation unit is a picture, and an access unit for that picture includes all the coded, e.g., compressed, data for that picture. The presentation unit for audio elementary streams is defined as the set of digital audio samples in a single audio frame. An access unit for a given audio frame will include all the coded, e.g., compressed, data for that audio frame.

Each elementary stream, as further defined by the MPEG-2 standard, is packetized to form a packetized elementary stream (PES). Each PES packet in a given stream includes a PES packet header followed by a payload containing one or more access units of that elementary stream. The PES structure provides a means for packaging subparts, i.e., one or more access units, of a longer elementary stream into consecutive packets along with associated indicators and overhead information used to synchronize the presentation of that elementary stream with other related elementary streams, e.g., elementary streams of the same program. Each PES is assigned a unique packet identifier (PID).

Additionally, one or more PES may be further segmented or packetized to facilitate combining those streams into a single bitstream for transmission over a given medium. MPEG-2 specifies two different protocols for combining one or more PESs into a single bitstream: (1) the program stream (PS) protocol; and (2) the transport stream protocol. Both stream protocols are packet based and fall into the category of transport layer entities, as defined by the ISO Open Systems Interconnection (OSI) reference model. Program streams utilize variable length packets and are intended for error-free environments in which software parsing is desired. Program stream packets are generally large, e.g., in the range of 1K to 2K bytes. Transport streams utilize fixed length packets and are intended for transmission in noisy or "errored" environments. Each transport stream packet comprises a header portion and a payload portion. As described above, transport stream packets have a relatively short length of 188 bytes and include features for enhanced error resiliency and packet loss detection.

The MPEG-2 transport stream specification provides a standard format for combining one or more PESs into a single transport stream that may then be transmitted over a given medium. FIG. 1 graphically illustrates the generation of an MPEG-2 transport stream from a plurality of PESs. Generation of an MPEG-2 transport stream begins by segmenting each PES and inserting successive segments into the payload sections of successive transport stream packets. For example, as illustrated in FIG. 1, one of the PES packets 10 of the PES containing the coded video of elementary stream "Video 1", is segmented and inserted into the payload sections of two consecutive transport packets 12, 14. Every transport packet has a header, for example, header 16 of transport packet 12, and the header of each transport packet contains the PID associated with the PES carried in that transport packet. In the example illustrated in FIG. 1, the PES carrying the coded video of elementary stream "Video 1" has been assigned a PID of '10', and therefore, the header of each transport packet 12, 14 carrying the data of that PES will contain a PID value of '10'. Similarly, the headers of each transport packet 18, 20 carrying the PES data for elementary stream "Audio 1" will contain the PID assigned to that elementary stream, which in the example shown is '23'. As each PES is segmented and inserted into respective transport packets, those packets are fed to a transport stream multiplexer 22 that multiplexes the packet to form a single bit stream, referred to as a "Transport Stream". Thus, a transport stream comprises a continuous sequence of transport packets, each of which may carry data from one of a plurality of PESs. At a decoder location, a given PES can be recovered from the incoming transport stream by simply extracting every incoming packet whose header contains the PID assigned to that PES.

Generation of transport packets is carried out by an encoder employing a common system clock. Decoders for receiving and presenting a selected program must have a system clock whose frequency of operation and absolute instantaneous value match those of the encoder. However, in practice, a decoder's free running system clock frequency will not match the encoder's system clock frequency exactly. Therefore, some method for synchronizing the decoder system clock with the encoder system clock is required. In the MPEG-2 systems standard, synchronization of the encoder's and decoder's system clocks is achieved using time stamps called Program Clock References (PCRs). A PCR is typically an actual sample of the encoder's system clock. For each program carried in a given transport stream, PCRs must be generated at least once every 100 ms and inserted into the transport packets carrying one of the elementary streams that make up that program. For programs comprised of a video elementary stream and an audio elementary stream, PCRs are typically generated and inserted into the transport packets that carry the PES data for the video elementary stream. In the example shown in FIG. 1, one PCR 24 was generated during the creation of transport packet 12 and another PCR was generated during the creation of transport packet 14, each of which carry PES data for the video elementary stream "Video 1". Similarly, a PCR 28 was generated during the creation of transport packet 32 which carries PES data for the video elementary stream "Video 21". Each PCR, as set forth above, is an actual sample of the encoder system clock at the time the PCR was generated and inserted into its respective transport packet.

At the reception site, a decoder can use the transmitted PCRs to "slave" its system clock to the encoder's system clock. Decoders allow recipients of a transport stream to select one of the programs carried in the transport stream for output or presentation at the reception site. For example, in a subscription television system, wherein each program may represent a different television broadcast, a subscriber may employ a decoder to select one of those programs for viewing on a television set. A television program will typically comprise a video elementary stream and an audio elementary stream.

In certain prior art systems, plural multiplexers are used in conjunction with the encoding equipment, thereby providing a redundant system that provides improved fault tolerance and system reliability. In the case of a system that employs redundant multiplexers, it is important to synchronize the various equipment to a requisite reference. In one prior art example shown in U.S. Pat. No. 5,502,499, entitled "Synchronizing Waveform Generator", to Birch et al., and assigned to Scientific-Atlanta, Inc., the assignee of the instant invention, the disclosure of which is incorporated by herein by reference in its entirety, the arrangement involving plural multiplexers or other digital or analog data equipment is synchronized using a continuous wave signal for locking all of the equipment to a common reference. This situation is analogous to the common practice in telecommunication systems of providing a continuous "pilot" signal at various frequencies for regulation, alarms and/or protection switching control in steps of a multiplex above a channel bank level.

As will be appreciated, it is extremely important to insert accurate PCR data into MPEG-2 packets so that proper synchronization of programs that are encoded on different encoders and which may be transmitted using different redundant multiplexers or decoded by different decoders may be accurately delivered to the end user. For example, related audio and video signals for a given program may be encoded on different encoders, transmitted by different multiplexers and decoded by different decoders. If the PCR is not accurately provided to each of the devices, synchronization of the audio and video portions of a program may be compromised, thereby causing the received program to be unintelligible. Accordingly, what is needed is a method and apparatus for accurately providing PCR data to various equipment in a robust manner, especially in the case of a system that includes redundant equipment arrangements, in which case it is not necessarily known what equipment will be transmitting at any given moment in time.

SUMMARY OF THE INVENTION

In order to satisfy the synchronization requirements of digital transmission systems, especially those in which a redundant architecture is employed, the present invention utilizes the existing frequency reference signal, such as, for example, a continuous wave signal for locking all equipment to a given reference, as a carrier for delivering PCR data to all of the various devices of the digital transmission system in a robust manner.

In particular, the instant invention uses the multiplexer synchronization signal of a digital transmission system to carry PCR data to various devices. The method and apparatus of the present invention are directed to encoding the PCR information on to the multiplexer synchronization signal used in various systems, thereby ensuring that all of the equipment receives valid PCR data in a robust manner. As described above, the multiplexer synchronization signal (M_SYNC) is a time and frequency reference used by various encoders and multiplexers used in a known redundant digital transmission system. The M_SYNC signal enables program streams from different encoders to be multiplexed together with the same information. The M_SYNC signal is a continuous wave signal that is comprised of a 3.375 MHz carrier that has, superimposed on it, a time marker. According to the present invention, the PCR is encoded onto the M_SYNC signal following the time marker. The PCR is defined as being true at the moment of the zero crossing of the frame marker. The zero crossings of the time marker, as well as the symbols representing the PCR value are all coincident with the zero crossings of the carrier signal.

The M_SYNC waveform provides a snapshot of the state of a PCR counter at a given moment of time. In a preferred embodiment, the snapshot occurs at 20 msec intervals. However, it will be understood that the interval is arbitrary and may be modified by system designers as required. The 3.375 MHz M_SYNC signal acts as a carrier for the encoded PCR data, and provides a frequency reference for equipment downstream, i.e., any encoders and multiplexers, while the PCR is used to synchronize the phase or value of the counters that lock to the 3.375 MHz reference carrier. The M_SYNC signal with the encoded PCR data may be created, in a preferred embodiment, by having two state machines. Both state machines are initialized by a signal corresponding to the frame marker, i.e., a pulse every 20 msec or any other convenient period. The first state machine normally has a modulo of four and is clocked by 13.5 MHz. This four state sequence is used to create four digital samples of a sine wave, i.e., the 3.375 MHz carrier. It will be noted that 13.5 MHz/4 equals 3.375 MHz. At marker time, however, the state machine goes beyond the first state and counts to 55. In doing this, the state machine generates an address that may be applied to a PROM that will, in turn, create the digital waveshape of the marker pulse. After reaching 55, the first state machine will return, not to zero, but to eight and then start incrementing again through to 55. Each time it reaches 55, the first state machine will increment a second state machine. After the first state machine the 8 to 55 process 43 times (the number of bits in a PCR plus the frame marker), the second state machine will generate a signal that tells the first state machine to go back to its modulo-4 mode. The above-described process will occur again on the next frame pulse.

As set forth above, the markers, including the frame and PCR, are created by providing an address to a PROM. Another address line to the POM is fed the value of the PCR number. The value, which is constant throughout each individual marker time period, indicates whether the marker will be normal or inverted, i.e., one or zero. Thus, the PCR value is encoded onto the M_SYNC signal.

DESCRIPTION OF THE DRAWINGS

The invention will be described in detail herein with reference to the following drawings in which like reference numerals refer to like elements, and wherein.

DETAILED DESCRIPTION OF PREFERRED EMBODIMENTS

Figure 1:
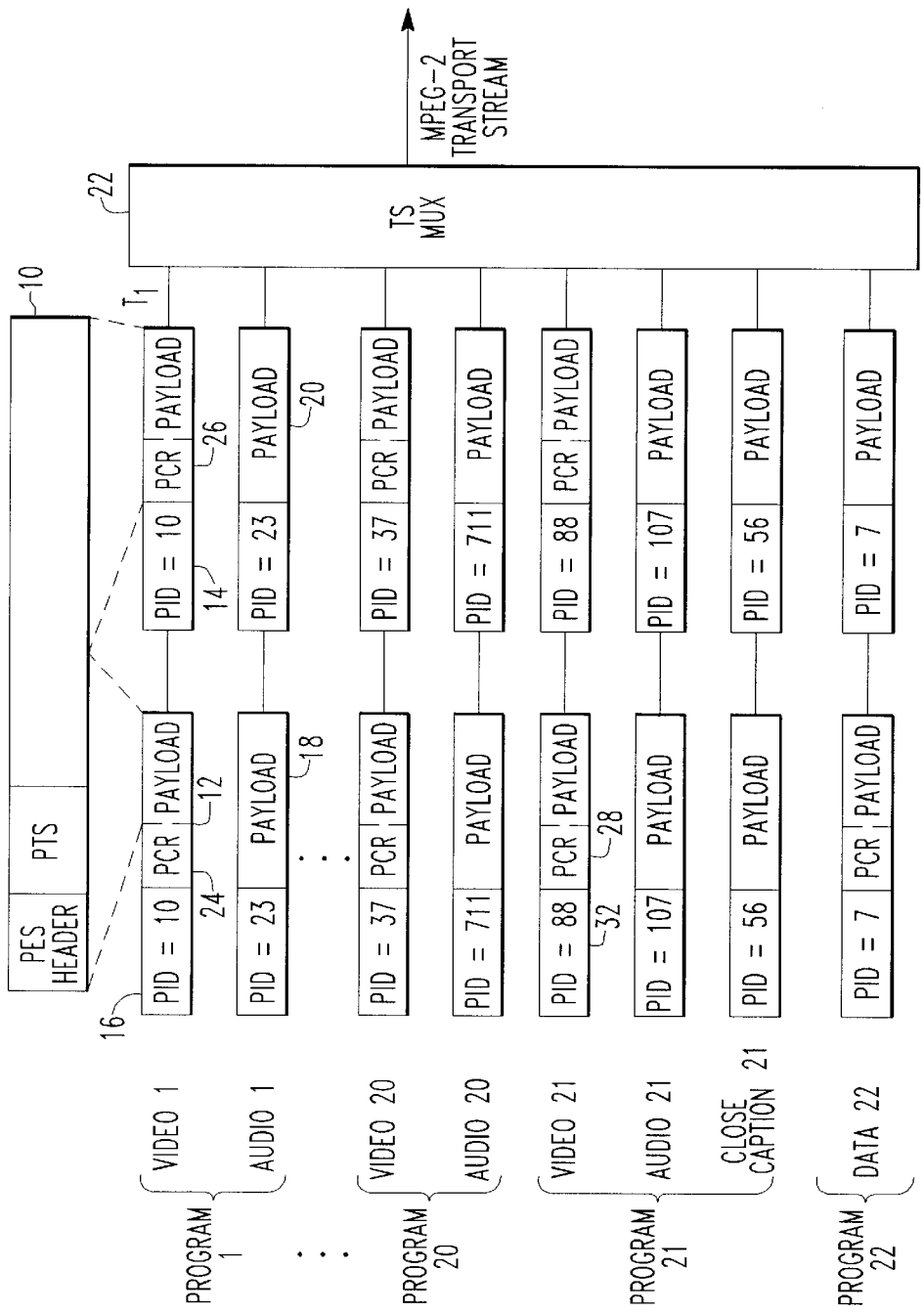
FIG. 1 is a graphical illustration of the generation of an MPEG-2 Transport Stream from a plurality of Packetized Elementary Streams in an MPEG-2 compliant encoder.
Figure 2:
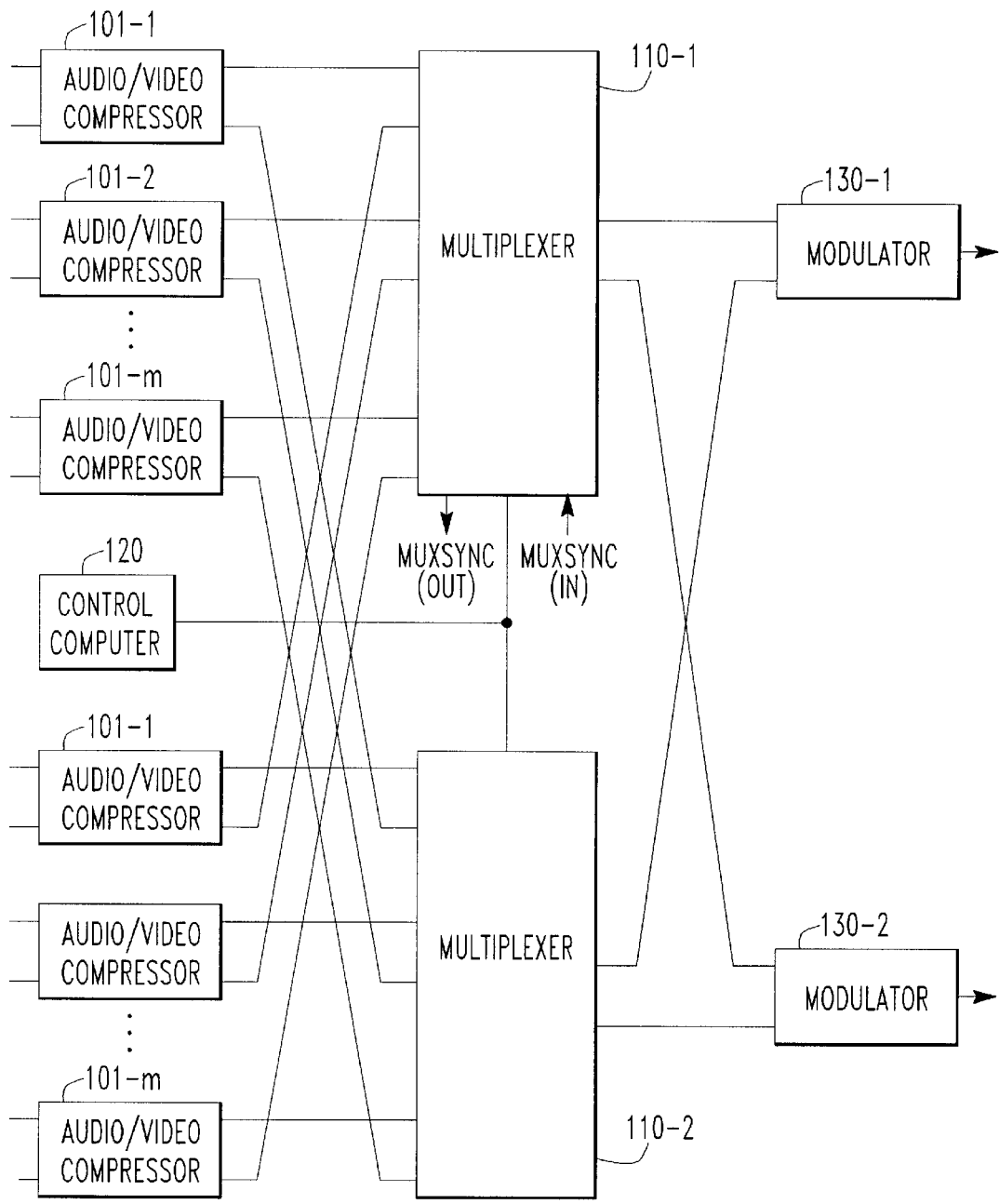
FIG. 2 illustrates a redundant configuration wherein the multiplexer functions are duplicated such that if a particular multiplexer fails, control may be transferred to the redundant multiplexer.

Referring now to FIG. 2, an arrangement is shown for providing multiplexers 110 in a redundant or hot standby configuration. According to FIG. 2, two multiplexers 110 are configures such that one is a hot standby for the other. Should, for example, multiplexer 110-1 fail for some reason, operation may be switched, either manually or automatically, multiplexer 110-2, through duplicated links from audio/video compressors 101-1 to 101-m. Similarly, if one modulator 130 fails, then whichever multiplexer 110 is activated may input data to the other modulator through duplicated links to each.

In such arrangements which involve plural multiplexers or other digital or analog data input equipment, it is typical for equipment to be synchronized using a continuous wave signal for locking all equipment requiring a reference. For example, in telecommunications systems, it is known to provide pilot signals at various frequencies for regulation, alarms, and/or protection switching control in steps of a multiplex above a channel bank. For digital audio compression, a convenient frequency for a continuous wave clock signal is 13.5 MHz, or multiples or submultiples thereof According to the present invention, in a preferred embodiment, a frequency of 3.375 MHz, i.e., 13.5 MHz divided by four, is a preferred frequency for the continuous wave clock signal. As a result, the phase lock loop design for locking to the frequency is simplified. Moreover, 3.375 MHz falls within the standard bandwidths of practically any known video format, either standard definition or high definition, and so can be carried over any conventional media, including twisted pair, cable or optical fiber.

According to the present invention, a 50 Hz frame synchronization signal or marker may be inserted to conform the digital frame. A synchronization signal at 50 Hz is one which is identically utilized in several different known or proposed television formats. On the other hand, the apparatus for generating a synchronizing signal for the apparatus shown in FIG. 2 should not be construed so narrowly. For example, a 60 Hz or other convenient interruption signal may likewise be employed as desired. The interruption signal signals and analog 3.375 MHz signal generator to begin dampening to zero according to a cosine squared damping function and insert a special frame identifier signal at a predetermined location signal, for example, within one cycle of receipt of the interrupt signal. This special signal may the signal a precise frame synchronization location by means of, for example, a zero crossing, and preferably comprising once cycle of a sinusoidal waveform at a higher signal level but of significantly lower frequency.

It is desirable to avoid complicated locking circuitry of the prior art and thus specially design the synchronization signal for locking various encoder location equipment and decoder equipment if necessary. The M_SYNC signal shown in U.S. Pat. No. 5,502,499, referred to above achieves this objective and is generated by interrupting at 50 Hz the generation of the continuous wave signal of 3.375 MHz and 0.5 v pp. After receipt of the interruption signal, the signal size is increased in amplitude from its original size, such as, for example, up to twice its size from 0.5 v pp to 1 v pp. The M_SYNC signal may be generated using either an analog or digital signal continuous periodic waveform generator.

Figure 3:
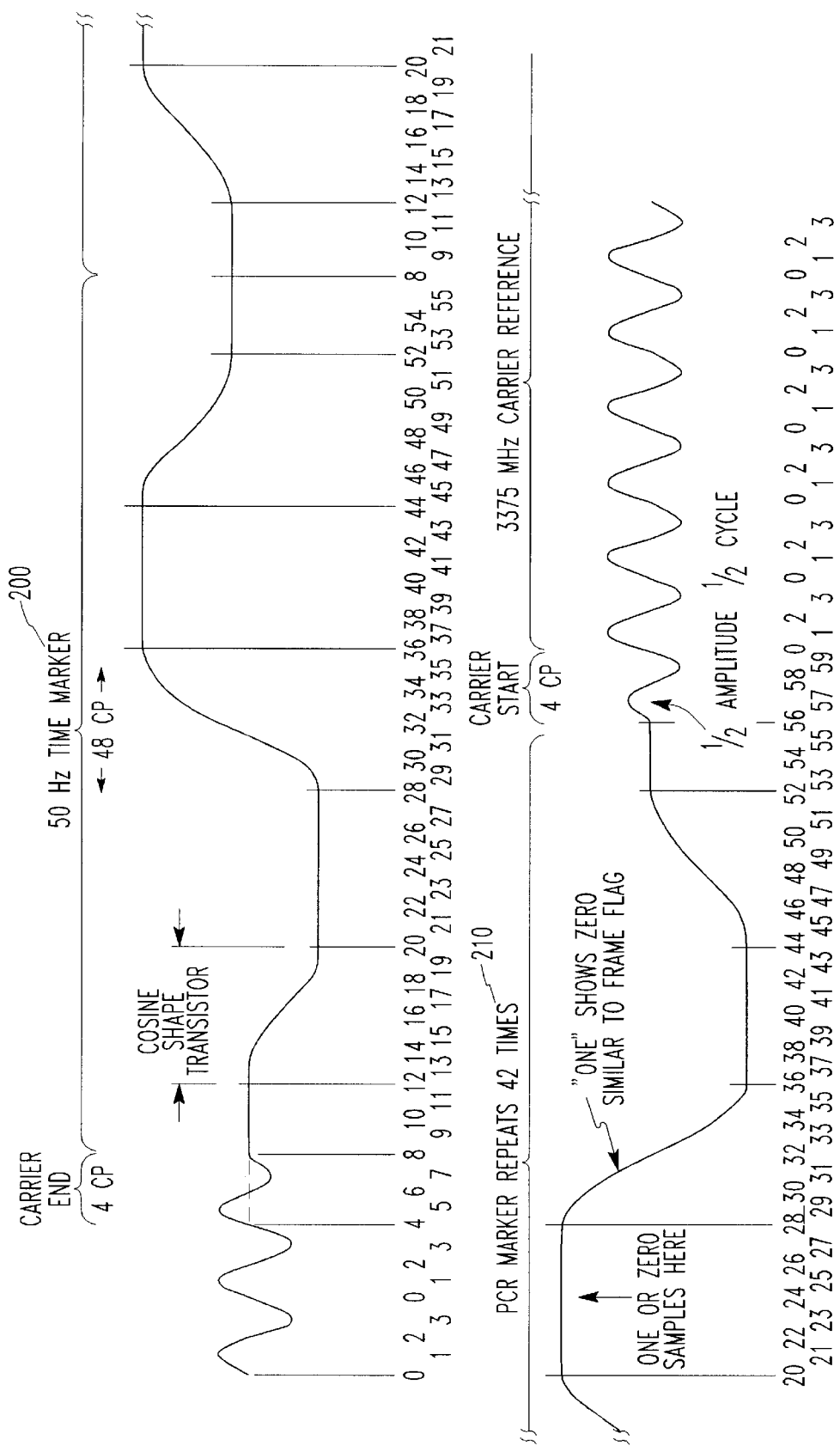
FIG. 3 shows a timing diagram of an M_SYNC signal encoded with a PCR code.

According to the present invention, the M_SYNC signal has superimposed thereon, a time marker 200 followed by a corresponding PCR value 210 as shown in FIG. 3. The PCR is defined as being true at the moment of the zero crossing of the frame marker 200. In a preferred embodiment, the zero crossings of the time marker, as well as the symbols representing the PCR value are all coincident with the zero crossings of the carrier. As described above, the M_SYNC signal provides a snapshot of the state of the PCR counter (not shown). The snapshot may occur at any given interval, and has been chosen, in a preferred embodiment of the instant invention to be 20 ms. The 3.375 MHz carrier is sent along to act as a frequency reference for downstream equipment as described above, while the PCR synchronizes the phase, or value, of the counters that lock to the 3.375 MHz reference carrier.

Figure 4:
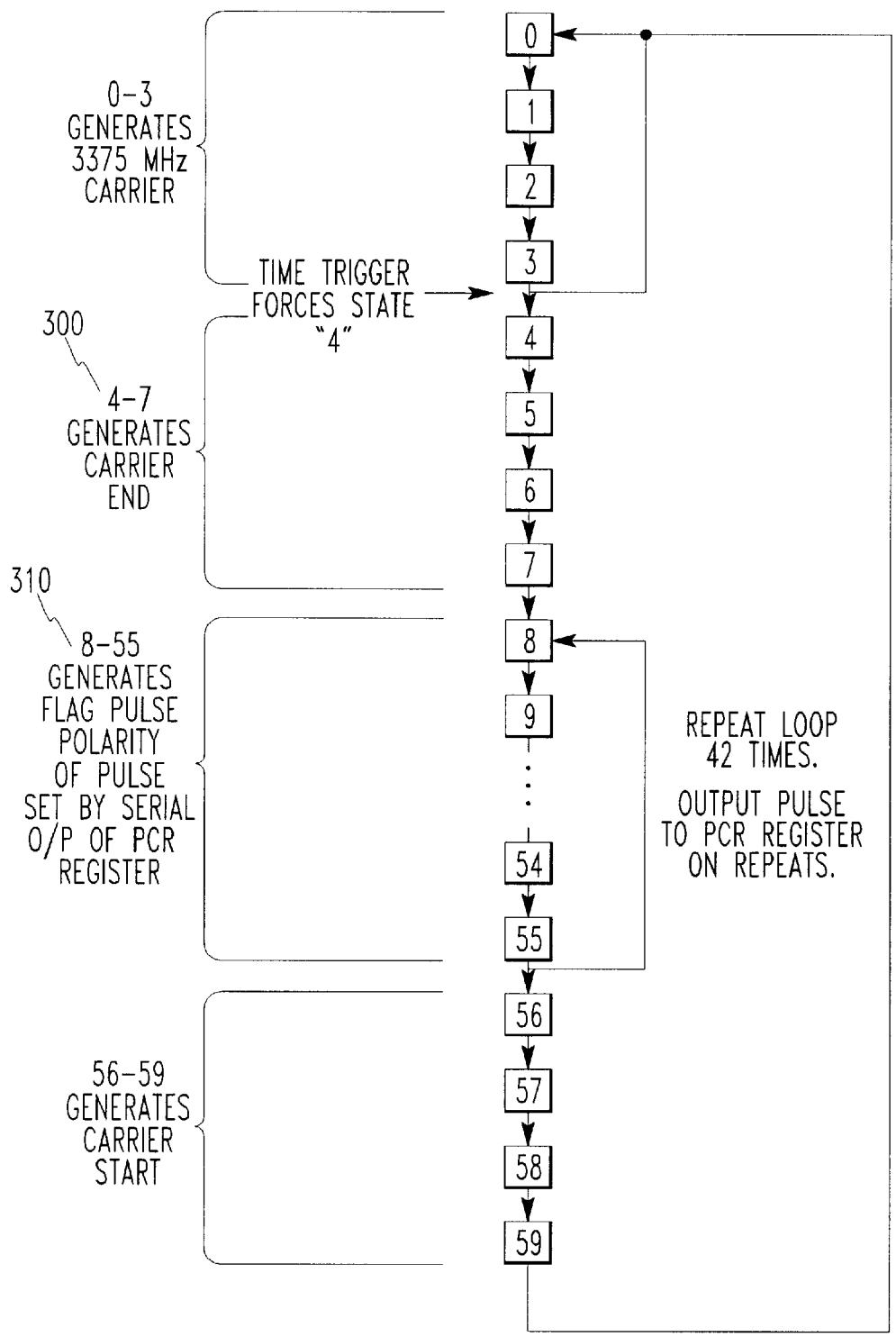
FIG. 4 is a block diagram of a state machine used in generating an M_SYNC signal encoded with a PCR code.

According to the present invention, the M_SYNC signal encoded with the PCR value may be created by having two state machines 300, 310 as shown in FIG. 4. Both state machines 300, 310 are initialized by a signal corresponding to the frame marker. The first state machine 300 normally has a modulo of four and is clocked by 13.5 MHz, as discussed above. The four state sequence of state machine 300 is used to create four digital samples of a sine wave, such as, for example, the 3.375 MHz carrier signal. At marker time, the state machine 300 goes beyond its first state and counts to fifty-five. In performing the fifty-five count, the state machine 300 generates an address that may be applied to a memory, such as, for example, a programmable read-only memory (PROM) (not shown) that will, in turn, create the digital wave shape of the marker pulse. After reaching fifty-five, the first state machine 300 will return, not to zero, but to eight, and then start incrementing again through fifty-five. The state machine 300 returns to state eight rather than state zero because the first eight states describe the four points on the reference carrier plus the required run-in to the PCR marker symbols. This transition area is only required at the beginning and end of the 43 symbol PCR period. Each time the counter of the first state machine reaches fifty-five, it increments the second state machine 310.

After the first state machine 300 goes through the eight to fifty-five process forty-three times, the second state machine 310 will generate a signal that tells the first state machine 300 to go back to its modulo four mode, i.e., counting 0, 1, 2, 3, 0, etc. The entire process described above will be repeated at the detection of successive frame pulses. As noted above, the markers, including the frame and PCR are created by providing an address to a PROM. Another address line to the PROM is fed the value of the PCR number. The value indicates whether the marker will be normal or inverted. Thus, the PCR value is encoded onto the M_SYNC signal.

Figure 5:
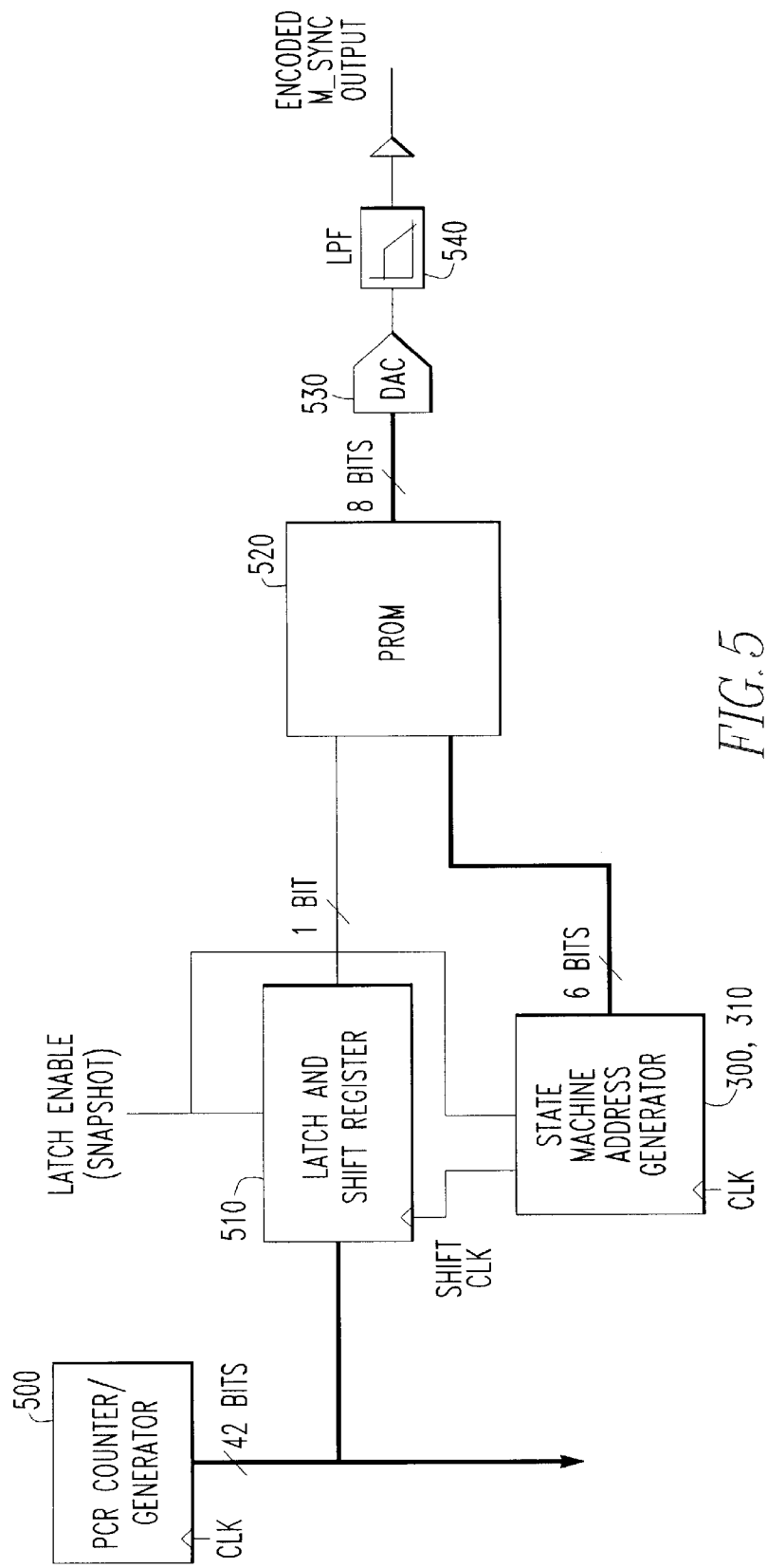
FIG. 5 is an illustrative block diagram of a preferred implementation the PCR generator.

Referring now to FIG. 5, a block diagram illustrating the PCR generator according to a preferred embodiment of the instant invention is shown. The PCR counter 500 provides the forty-two bit PCR value, as discussed above. The PCR word is sampled periodically, e.g., in a preferred embodiment of the invention, at 20 msec intervals, by a forty-two bit wide latch/shift register 510. As the PCR value is sampled, the state machine 300, 310 is triggered to operate as described above with respect to FIG. 4. The state machine 300, 310 generates an address to the PROM 520. Additionally, the state machine 300, 310 generates a shift clock for the latch/shift register 510.

The address generated by the state machine 300, 310 is directed to the PROM 520 which contains the appropriate symbols, i.e., high or low signals, such as, for example '1' or '0', for the encoded M_SYNC signal symbols, the polarity of which is controlled by the value of the PCR number. The PCR number is serially and bit-by-bit shifted out of the latch/shift register 510 by the state machine 300, 310, into the PROM 520. The output of the PROM 520 is processed by a digital to analog converter (DAC) 530 where the digital encoded M_SYNC signal is converted to an analog encoded M_SYNC signal. The output of the DAC 530, i.e., the analog encoded M_SYNC signal, is subsequently fed to a low-pass filter (LPF) 540 which filters the encoded analog M_SYNC signal to ensure that the output, i.e., the encoded M_SYNC signal, does not contain any harmonic disturbances or repeat spectra from the digital sampling process.

While the invention has been described herein with reference to specific embodiments thereof, it will be understood that many alternatives, modifications and variations will be apparent to those skilled in the art. Accordingly, the preferred embodiments of the invention, as set forth herein are intended to be illustrative, not limiting. Various changes may be made without departing from the true spirit and full scope of the invention, as defined in the following claims.

What is claimed is:

1. A method of encoding a clock signal on a frequency reference carrier, comprising the steps of:

generating a continuous periodic waveform having a frequency within the television bandwidth;

interrupting the generation of the continuous periodic waveform;

generating a frame marking signal;

inserting said frame marking signal in said continuous periodic waveform;

encoding a clock reference signal on said continuous periodic waveform following said frame marking signal; and transmitting said continuous periodic waveform encoded with said clock reference signal to a plurality of digital transmission devices.

2. The method of claim 1, wherein said continuous periodic waveform has a frequency of 3.375 MHz.

3. The method of claim 2, wherein said clock reference signal comprises a program clock reference signal.

4. The method of claim 3, wherein said program clock reference signal comprises 42 bits.

5. The method of claim 3, wherein the step of encoding further comprises:

extracting said program clock reference from a memory, wherein an address in said memory containing said program clock reference is derived in a state machine.

6. An apparatus for encoding a frequency reference carrier with a program clock reference, comprising:

a continuous periodic waveform generator for generating a frequency reference carrier;

a program clock reference generator for generating a program clock reference, said program clock reference generator comprising a state machine for generating an address and a memory containing a plurality of program clock references, said address being generated by said state machine, indicating a specific one of said program clock references contained in said memory; and a combiner for combining said frequency reference carrier with said program clock reference.

7. The apparatus of claim 6, wherein said memory comprises a programmable read-only memory.

8. The apparatus of claim 6, wherein said continuous periodic waveform generator generates a waveform having a frequency of 3.375 MHz.

9. An apparatus for generating a frequency reference carrier encoded with program clock reference data, comprising:

a program clock reference generator;

a latch for receiving digital samples of said program clock reference data;

a state machine operatively coupled to said latch;

a memory operatively coupled to said latch and said state machine; and a digital to analog converter for converting a digital output of said memory to an analog signal.

10. The apparatus of claim 9, further comprising a filter connected to an output of said digital to analog converter.

11. The apparatus of claim 10, wherein said filter comprises a low-pass filter.

12. The apparatus of claim 9, wherein said state machine provides a clock signal to said latch.

13. The apparatus of claim 8, wherein said latch comprises a shift register.

14. The apparatus of claim 9, wherein said program clock reference generator is sampled at predetermined intervals.

15. The apparatus of claim 14, wherein said predetermined interval is approximately 20 msec.

16. The apparatus of claim 9, wherein said memory contains symbol data corresponding to said program clock reference data.

17. The apparatus of claim 16, wherein said memory comprises a programmable read-only memory.

* * * * *